United States Patent [19]

Ohmae et al.

[11] 4,309,484

[45] Jan. 5, 1982

[54] LAMINATED SAFETY GLASS

[75] Inventors: Tadayuki Ohmae; Yoshinori Kanno, both of Niihama, Japan

[73] Assignee: Sumitomo Chemical Company, Limited, Osaka, Japan

[21] Appl. No.: 197,573

[22] Filed: Oct. 16, 1980

[30] Foreign Application Priority Data

Apr. 22, 1980 [JP] Japan .................................. 55-53969

[51] Int. Cl.$^3$ ........................ B32B 17/10; B32B 27/32
[52] U.S. Cl. ...................................... 428/441; 156/99; 156/106; 428/442; 428/522; 428/523; 428/911
[58] Field of Search ............... 428/442, 441, 415, 522, 428/523, 911, 426; 156/106, 99, 330, 334, 327

[56] References Cited

U.S. PATENT DOCUMENTS

| | | | |
|---|---|---|---|
| 3,532,590 | 10/1970 | Priddle | 428/442 |
| 3,912,542 | 10/1975 | Hirano et al. | |
| 4,137,364 | 1/1979 | Ball | 428/442 |

FOREIGN PATENT DOCUMENTS

| | | |
|---|---|---|
| 49-24210 | 4/1974 | Japan . |
| 53-88075 | 3/1978 | Japan . |
| 1352088 | 5/1974 | United Kingdom . |

*Primary Examiner*—Ellis P. Robinson
*Attorney, Agent, or Firm*—Birch, Stewart, Kolasch & Birch

[57] ABSTRACT

A laminated safety glass comprising at least two glass plates and an interlayer, said interlayer comprising a crosslinked product of a hydration reaction product of an ethylene copolymer comprising (1) 60 to 95% by weight of ethylene, (2) 5 to 40% by weight of glycidyl acrylate or methacrylate, (3) 0 to 20% by weight of one or more comonomer selected from the group consisting of a vinyl ester having 4 to 10 carbon atoms and an ester of acrylic or methacrylic acid with an alcohol having 1 to 12 carbon atoms, said hydration reaction product having a hydration rate of epoxy group of preferably 5 to 80% by mole, more preferably 30 to 70% by mole.

3 Claims, No Drawings

LAMINATED SAFETY GLASS

The present invention relates to a laminated safety glass. More particularly, it relates to a laminated safety glass comprising at least two glass plates and an interlayer of a novel self-crosslinking, adhesion ethylene copolymer having high performances.

Hitherto, a thermoplastic polyvinyl butyral resin has been used as an adhesion interlayer for laminated safety glass such as front glass of automobile or window glass of high buildings, because the resin satisfies the required performances and no other resin having suitable properties has ever been found.

It is well known that the laminated safety glass should have excellent transparency, penetration resistance, weatherability, heat resistance, freeze resistance or the like. The laminated safety glass having an interlayer of the thermoplastic polyvinyl butyral containing plasticizers satisfies almost all of these requirements. However, the thermoplastic polyvinyl butyral interlayer of the prior is rubber-like at room temperature and has high stickiness at the surface thereof requiring that the stickiness be inhibited by making the surface of the interlayer uneven and spreading powdery sodium bicarbonate thereon. This requires troublesome steps such as removal of the powder by washing with water and subsequent drying when it is used in the production of laminated glass. Besides, since the resin interlayer shows increased stickiness and inferior workability at a high temperature, the laminating step is usually carried out under a controlled condition of temperature (e.g. 20° C.). Moreover, the resin has a large hygroscopicity and decreases its adhesion, heat resistance and weatherability when it adsorbs moisture, and hence, it must be handled under constant moisture (e.g. at relative moisture of 20%) in order to control the water content of the resin to 0.5% or lower. Thus, the thermoplastic polyvinyl butyral resin has such a significant drawback when used as an interlayer for laminated safety glass.

As a result of the present inventor's intensive study, it has been found that a crosslinking hydration reaction product of ethylene-glycidyl acrylate compound copolymer is particularly suitable as an interlayer for the laminated safety glass.

An object of the present invention is to provide an improved interlayer useful for the laminated safety glass, which comprises a specific self-crosslinking, hydration reaction product of a specific ethylene copolymer. Another object of the invention is to provide an improved laminated safety glass comprising at least two glass plates and the specific interlayer as set forth above. These and other objects and advantages of the present invention will be apparent to persons skilled in the art from the following description.

The laminated safety glass of the present invention comprises at least two glass plates and an interlayer, said interlayer comprising a crosslinked product of hydration reaction product of an ethylene copolymer which is produced by subjecting a two-component or three-component ethylene copolymer comprising (1) 60 to 95% by weight of ethylene, (2) 5 to 40% by weight of glycidyl acrylate or methacrylate, and (3) 0 to 20% by weight of one or more comonomer selected from the group consisting of a vinyl ester having 4 to 10 carbon atoms and an ester of acrylic or methacrylic acid with an alcohol having 1 to 12 carbon atoms to a hydration reaction, whereby the epoxy group contained in the copolymer is partially hydrated, followed by subjecting the hydration reaction product to cross-linking reaction.

The interlayer of the present product derived from the hydration reaction product of an ethylene copolymer has the following advantages and is valuable from the industrial viewpoint.

The interlayer of the present invention has less adhesion and less hygroscopicity, and hence the workability in the production of the laminated glass is significantly improved. Besides, the resin used as the interlayer is obtained in the powder form, and can be used in this form for adhering with glass by the conventional powder coating technique, thereby simplifying the step of producing the laminated glass and minimizing the cost for the production of laminated safety glass.

Moreover, the interlayer of the present invention has self-crosslinking properties in addition to the excellent adhesion and flexibility and the epoxy group and hydroxy group contained in the resin can readily react with each other only by heating to form crosslinkage, and thereby significantly improve the strength and heat resistance of the interlayer.

Thus, the laminated safety glass obtained by using the interlayer of the present invention has excellent properties such as excellent transparency, penetration resistance, weatherability, heat resistance, freeze resistance and satisfies the performances required for safety glass and is more valuable than the conventional safety glass.

The ethylene copolymer used as a base resin for the interlayer can be produced by conventional processes. For instance, it can be produced by copolymering ethylene and a comonomer in the presence of a free-radical generating agent (e.g. oxygen, an organic peroxide or an azo compound) and a polymerization modifier (e.g. ethane, propane, propylene) under a pressure of 500 kg/cm$^2$ or more and at a temperature of 40° to 200° C. (cf. Japanese Patent Laid Open Application No. 23490/1972). This copolymerization is preferably carried out continuously in order to obtain a homogeneous copolymer.

The base ethylene copolymer is a two-component or three-component ethylene copolymer comprising (1) 60 to 95% by weight of ethylene, (2) 5 to 40% by weight of glycidyl acrylate or methacrylate, and (3) 0 to 20% by weight of one or more comonomers selected from a vinyl ester having 4 to 10 carbon atoms and an ester of acrylic or methacrylic acid with an alcohol having 1 to 12 carbon atoms.

The vinyl ester includes vinyl acetate, vinyl propionate, vinyl butyrate, vinyl benzoate, or the like. The ester of acrylic or methacrylic acid with an alcohol includes methyl acrylate, ethyl acrylate, propyl acrylate, butyl acrylate, cyclohexyl acrylate, methyl methacrylate, ethyl methacrylate, propyl methacrylate, butyl methacrylate, cyclohexyl methacrylate, or the like.

The adhesion and strength of the interlayer of the present invention are owing to the presence of the glycidyl acrylate or methacrylate component of the ethylene copolymer. When the content of the glycidyl acrylate or methacrylate is less than 5% by weight, the interlayer obtained therefrom shows inferior adhesion and strength, and when the glycidyl acrylate or methacrylate is contained in the copolymer in the range of 5 to 40% by weight, there can be obtained the desired interlayer having excellent properties. The ethylene copolymer may optionally contain 0 to 20% by weight of the vinyl ester and/or (meth)acrylic ester as the third component, which is effective on the improvement of transparency of the product. When this third component is over 20% by weight, the resin shows unfavorably increased tackiness.

Particularly suitable ethylene copolymer is a three-component copolymer comprising (1) 70 to 90% by weight of ethylene, (2) 10 to 30% by weight of glycidyl methacrylate, and (3) 3 to 15% by weight of vinyl acetate or methyl acrylate. The ethylene copolymer has preferably a melt index of 10 to 500, particularly 20 to 200 (which is measured by the method as disclosed in JIS K 6760-1971). When the melt index is lower than the above range, the interlayer shows inferior processability, and on the other hand, when the melt index is higher than the above range, the interlayer tends to show decreased strength.

The ethylene copolymer is subjected to hydration reaction by a conventional process, but preferably, the hydration reaction of the ethylene copolymer is carried out in a three-component mixed solvent consisting of a good solvent, a poor solvent other than water, and water in the presence or absence of an alkali or acid catalyst at a temperature of higher than the melting point of the copolymer, by which the powdery hydration reaction product of the ethylene copolymer is directly obtained (cf. Japanese Patent Application No. 26262/1979).

The weight ratio of the good solvent and poor solvent in the solvent system is in the range of 1/10 to 10/1, preferably 1/5 to 5/1 (good solvent/poor solvent), and the weight ratio of the poor solvent and water is in the range of 1/50 to 50/1, preferably 1/10 to 10/1 (poor solvent/water). The three-component solvent is usually used in a weight ratio to the copolymer of 1/1 to 50/1, preferably 2/1 to 20/1 (the solvent/the copolymer).

The good solvent used in the present invention includes aromatic hydrocarbons (e.g. xylene, toluene, benzene), naphthalene hydrides (e.g. tetralin, decalin), halogenated hydrocarbons (e.g. carbon tetrachloride, perchloroethylene, chlorobenzene), phthalic acid esters (e.g. dioctyl phthalate, dimethyl phthalate), and a mixture of two or more thereof. Particularly suitable examples of the good solvent are aromatic hydrocarbons having 6 to 9 carbon atoms, such as xylene, toluene, or benzene, or a mixture thereof.

The poor solvent used in the present invention includes solvents which are soluble in the above good solvents and water, for example, lower fatty alcohols having 1 to 4 carbon atoms (e.g. methanol, ethanol, isopropanol), cellosolves, acetone, cyclohexane, or a mixture thereof. Particularly suitable examples of the poor solvent are lower fatty alcohols having 1 to 4 carbon atoms, such as methanol, ethanol, isopropanol, or a mixture thereof.

The hydration reaction of the present invention may be carried out in the presence of a catalyst, such as an alkali (e.g. sodium hydroxide, potassium hydroxide, ammonia, triethylamine), or an acid (e.g. sulfuric acid, phosphoric acid, hydrochloric acid, acetic acid). The system of mixture of the poor solvent and water is preferably regulated in the range of a pH of 11 to 3. When the pH range is outside the above range, it results in corrosion of reaction vessel and the reaction product must be washed, which is disadvantageous from the industrial viewpoint.

The hydration reaction is carried out at a temperature of higher than the melting point of the copolymer, e.g. usually at 90° to 150° C., for more than one hour, usually for 3 to 10 hours.

The hydration of the copolymer may also be carried out by melt-kneading the copolymer in the presence of water with an extruder or Banbury mixer, by which there is obtained the hydration reaction product in the form of a pellet or a film.

The hydration reaction of the copolymer is preferably carried out at the hydration rate of the epoxy group of 5 to 80% by mole, more preferably 30 to 70% by mole, in order to obtain the desired interlayer. When the hydration rate is too low, the resin shows lower strength, and on the other hand, when the hydration rate is too high, the strength is high but the resin shows inferior processability due to too high of a crosslinkage. When the hydration rate is within the range of 30 to 70% by mole, the epoxy group and hydroxy group contained in the molecule of the hydration reaction product react to form an appropriate crosslinking bond, which can give suitable strength and flexibility to the interlayer.

The laminated safety glass can be produced by using the crosslinked product of the hydration reaction product of the present invention as the interlayer by the conventional methods, such as the following methods. The crosslinked product means a product which is swollen but substantially does not dissolve in hot xylene (90° C.).

(1) A crosslinked film of the hydration reaction product of ethylene copolymer is previously prepared, and the film is put between glass plates, and then the glass plates are laminated.

(2) The powdery hydration reaction product of ethylene copolymer is spread in the form of a layer between glass, and the resultant is heated to crosslink the hydration reaction product.

(3) A non-crosslinked film of the hydration reaction product of ethylene copolymer is put between glass plates, and the resultant is heated to crosslink the film.

According to the above method (1), the hydration reaction product is previously formed into a crosslinked film by subjecting the hydration reaction product to extrusion processing, calendering, or pressing at a temperature of 130° to 200° C. and the crosslinked film thus prepared is laminated with glass plates. The lamination is carried out by putting the crosslinked film as an interlayer between glass plates and pressing the resultant at a temperature of 90° to 200° C., preferably 110° to 150° C., under a pressure required for adhering the interlayer and for removing air bubbles present at the interface or within the interlayer. This method for the production of laminated glass can be done by using the same apparatus as used in the production of laminated glass using thermoplastic polyvinyl butyral.

According to the above method (2), the powdery hydration reaction product is put in the form of a layer on the surface of a glass plate by the conventional powder coating technique and then another glass plate is piled on the coating layer, and the resulting piled plates are subjected to the heat-pressing as in the above method (1). Alternatively, according to the method as disclosed in Japanese Patent Laid Open Application No. 24210/1974 and 124110/1974, the powdery hydration reaction product is uniformly spread on a glass plate, and thereon another glass plate is piled, and the resulting plates are laminated by heating under reduced pressure.

In the above method (3), the conventional extrusion lamination technique is applied, and the noncrosslinked film of the hydration reaction product is laminated with glass plates, and thereafter, the film of the hydration reaction product is crosslinked.

The laminated safety glass thus prepared comprises at least two glass plates and the interlayer, but may be a multiple laminated product. The glass plates used in the present invention may be any commercial transparent or opaque glass plates, such as normal flat glass, polished plate glass, heat-ray absorbing plate glass, or the like, which may be subjected to surface treatment. The thickness of the glass plate and the interlayer is potionally decided in accordance with the kinds of applications of the final safety glass.

The laminated safety glass of the present invention may be laminated with other various inorganic or organic materials, such as metals or synthetic resins to form a multiple layer product. Besides, the interlayer may be incorporated with ultraviolet absorbers, antioxidants, colorants, plasticizers, expanding agents, various inorganic or organic powdery or fibrous fillers, various high molecular compounds, or the like in accordance with the applications of the final safety glass. Moreover, net-like or cloth-like structural materials may be laid between glass plates in order to strengthen the interlayer or for the purpose of decoration of the product.

The laminated safety glass of the present invention is widely used, for example, as windshield glass for automobiles, railway cars, airplanes, ships, or the like; as window glass of buildings; as bulletproof glass and others which require safety; and as show window case or decoration glass.

The present invention is illustrated by the following Examples but is not limited thereto.

In the Examples, various properties were measured in the following manner.

(1) Melt index:

It was measured under a load of 2160 g at 190° C. by the method as described in JIS K 6760-1971 and is shown by the amount of flowing out per 10 minutes (g/10 min).

(2) Content of glycidyl acrylate or methacrylate in the copolymer and hydration rate of epoxy group:

It was measured by back titration of epoxy group with hydroxylamine hydrochloride-sodium acetate.

(3) Tensile strength and elongation of the internal layer:

In accordance with the method as described in JIS K 6760-1971, ISO #1 dumbbell was prepared from a crosslinked film (thickness: 0.76 mm) obtained by heat-pressing the hydration reaction product under the conditions of 180° C. and 50 kg/cm² (unless specified otherwise) for 30 minutes, and the dumbbell was pulled at a rate of 200 mm/minute at 20° C. and the strength and elongation at break point of the dumbbell were measured.

(4) Tensile impact strength of the interlayer:

An S type dumbbell was prepared from a crosslinked film (thickness: 0.76 mm) obtained by the same manner as in the above (3), and the tensile impact strength of the dumbbell was measured at 20° C. in accordance with the provision of ASTM D1822-61T.

(5) Refractive index of the interlayer:

A crosslinked film obtained in the same manner as described in the above (3) was dipped in dimethyl phthalate ($\eta_D^{20}$ 1.15138) and the refractive index was measured at 20° C. with an elluminant of white light lamp with Abbe refractometer.

(6) Bond strength of the interlayer to glass:

A laminated product of glass/interlayer/Teflon sheet/glass was prepared by using a crosslinked film of hydration reaction product prepared in the same manner as described in the above (3) and normal glass plates (thickness: 3 mm, width: 25 mm, length: 80 mm) which was previously defatted with a mixture of acetone/toluene (1/1 by volume) and dried. The laminated product was heat-pressed at 130° C. for 30 minutes in a vacuum dryer, and thereafter, it was taken out and allowed to cool. The interlayer faced to glass was cut in a width of 15 mm with a knife and subjected to peeling test at a pulling rate of 100 mm/minute, at 20° C. and at a pulling angle of 180°, and then the bond strength of the product was measured.

(7) Light transparency and haze of laminated glass:

It was measured with standard light A in accordance with the method as described in JIS R 3205.

(8) Impact resistance of laminated glass:

It was measured by observing the breaking state of glass when a steel ball (weight: 255 g, diameter: 38 mm) was dropped onto the laminated glass from a height of 5 m in accordance with the method as described in JIS R 3205.

(9) Heat resistance of laminated glass (Boiling test):

In accordance with the method as described in JIS R 3205, a sample of laminated glass was vertically set in hot water of about 65° C. for 3 minutes, and immediately dipped in boiling water, and after dipping therein for 2 hours, the sample was taken out, and then the state of the sample was observed.

(10) Weatherability (light resistance) of laminated glass:

(i) Ultraviolet irradiation test:

A sample of laminated glass was put at a position of about 30 cm from an illuminant of a mercury vapor lamp (100 V, 6 A) and exposed to irradiation at 40° to 60° C. for 100 hours, in accordance with the method as described in JIS R 3205, and thereafter, the state of the sample was observed.

(ii) Outdoor exposure test:

A sample was exposed outdoor for 6 months from May to October, and then the state of the sample was observed.

EXAMPLE 1

Ethylene copolymer particles (content of ethylene: 72.9% by weight, content of glycidyl methacrylate: 19.1% by weight, content of vinyl acetate: 8.0% by weight, melt index: 160) (4 kg) were charged into 30 liter autoclave, and thereto were added xylene (6 kg), isopropanol (10 kg) and water (4 kg), said isopropanol and water being previously mixed and regulated at pH 9 with an aqueous sodium hydroxide solution. After the autoclave was purged with nitrogen gas, the mixture was subjected to hydration reaction with agitation at 130° C. for 4 and 6 hours to give the desired powdery hydration reaction products having a hydration rate of the epoxy group of 39% by mole and 56% by mole, respectively. The products were separated from the reaction mixture with a centrifugal separator after cooling to room temperature, washed with methanol in an autoclave, centrifuged again, and then dried at 50° C., 60 mmHg for 8 hours in a vacuum dryer.

The powdery hydration reaction products were each heat-pressed at 180° C. for 30 minutes to give a crosslinked film (thickness: 0.76 mm). The film was swollen but was not dissolved in hot xylene. The film was put between two normal glass plates (thickness: each 3 mm), and silicone rubber sheets were piled on both sides thereof. The thus piled product was heat-pressed at 130° C., 10 kg/cm² for 20 minutes to give a laminated glass. The properties of the crosslinked film and the laminated glass were measured in the manner as described hereinbefore. The results are shown in Table 1.

REFERENCE EXAMPLE 1

In the same manner as described in Example 1 except that the copolymer was used without subjecting to hydration reaction, an interlayer and a laminated glass were prepared. The properties of the products were measured likewise. The results are shown in Table 1.

REFERENCE EXAMPLE 2

The same copolymer as used in Example 1 was hydrated in the hydration rate of epoxy group of 2% by mole and the hydration reaction product was heat-pressed at 150° C. for 10 minutes to given a film (thickness: 0.76 mm). This film contained 12% by weight of hot xylene-insoluble part, which means that this product had large amount of non-crosslinked component. In the same manner as described in Example 1, a laminated glass was prepared by using the above film. The properties of the film and laminated glass were measured likewise. The results are shown in Table 1.

REFERENCE EXAMPLE 3

In the same manner as described in Example 1 except that ethylene-glycidyl methacrylate-vinyl acetate copolymer (content of ethylene: 90.4% by weight, content of glycidyl methacrylate: 1.2% by weight, content of vinyl acetate: 8.4% by weight, melt index: 150) was used and hydrated in the hydration rate of 57% by mole, a laminated glass was prepared. The properties of the product were measured likewise. The results are shown in Table 1.

In comparison with the products in the above Reference Examples 1 to 3, the crosslinked film obtained from the hydration reaction product in Example 1 had greater film strength, and further the laminated glass obtained by using the film showed excellent properties. The laminated glass had sufficiently excellent performances.

EXAMPLE 2

In the same manner as described in Example 1 except that ethylene-glycidyl methacrylate copolymer (content of ethylene: 78.3% by weight, content of glycidyl methacrylate: 21.7% by weight, melt index: 120) was used and hydrated in the hydration rate of epoxy group of 52% by mole, a crosslinked interlayer and a laminated glass were prepared. The properties of the products were measured likewise. The crosslinked interlayer was insoluble in hot xylene. The results are shown in Table 1.

REFERENCE EXAMPLE 4

In the same manner as described in Example 1 except that the same copolymer as used in Example 2 was used without subjecting to hydration reaction, an interlayer and a laminated glass were prepared. The properties of the products were measured likewise. The results are shown in Table 1.

In comparison with the product of Reference Example 3, the product of Example 2 had greater excellent properties. While the laminated glass of Example 2 was inferior to the product of Example 1 in the transparency and haze, the product of Example 2 showed sufficiently satisfactory performances for the purpose of other utilities which do not require transparency.

EXAMPLE 3

In the same manner as described in Example 1 except that ethylene-glycidyl methacrylate-methyl acrylate copolymer (content of ethylene: 76.1% by weight, content of glycidyl methacrylate: 15.5% by weight, content of methyl acrylate: 8.4% by weight, melt index: 70) was used and hydrated in the hydration rate of epoxy group of 60% by mole, a crosslinked interlayer and a laminated glass were prepared. The properties of the products were measured likewise. The crosslinked interlayer was insoluble in hot xylene. The results are shown in Table 1.

REFERENCE EXAMPLE 5

In the same manner as described in Example 1 except that the same copolymer as used in Example 3 was used without subjecting to hydration reaction, an interlayer and a laminated glass were prepared. The properties of the products were measured likewise. The results are shown in Table 1.

In comparison with the product of Reference Example 4, the product of Example 3 showed greater properties.

EXAMPLE 4

The same powdery hydration reaction product of copolymer as used in Example 1 (hydration rate of epoxy group; 56% by mole, 100 mesh pass product) was uniformly spread onto the same glass plate as used in Example 1, and thereon another glass plate was piled. The resulting piled product was pre-adhered by heating at 130° C. for 10 minutes in a vacuum dryer and further heated at 170° C. for 30 minutes, by which the glass plates were adhered while crosslinking the interlayer. After laminating of the glass plates, the interlayer had a thickness of 0.72 mm and was insoluble in hot xylene. The properties of the laminated glass were measured likewise. The results are shown in Table 1.

Thus, according to powder coating method, there could be obtained a product having similar properties to those of the product of Example 1.

EXAMPLE 5

The powdery hydration reaction product as obtained in Example 1 (hydration rate of epoxy group: 56% by mole) was melt-kneaded at 110° C. with an extruder (diameter: 40 mm) equipped with T die to give a roll of film (thickness: 0.76 mm). This film exhibited almost no tackiness and had 15% by weight of a hot xylene-insoluble part. This film was allowed to stand at 80° C. for one week to give a film which was insoluble in hot xylene. In the same manner as described in Example 1, a laminated glass was prepared by using the above-obtained film. The properties of the product were measured likewise. The results are shown in Table 1.

REFERENCE EXAMPLE 6

A commercially available plasticized polyvinyl butyral film (thickness: 0.76 mm) was washed with water and dried. A laminated glass was prepared by using this film in the same manner as described in Example 1. The properties of this product were measured likewise. The results are shown in Table 1.

The laminated safety glass of the present invention has excellent properties similar to or greater than the conventional product obtained by using plasticized polyvinyl butyral as is explained below.

In comparison with the conventional product of plasticized polyvinyl butyral, the interlayer of the present invention showes similar or greater properties, i.e. similar or greater tensile strength, larger elongation, similar or greater tensile impact strength, far greater adhesion to glass. Besides, the product of the present invention has a refractive index close to that of glass and is also characteristic in that the film does not show tackiness with an opposing layer of resin.

The laminated glass of the present invention shows similar light transparency and haze, similar decreasing rate of light transparency in weatherability test, improved absence of peeling at the circumference of glass, similar in the impact resistance (well agreeable to the requirements for laminated glass) and further is greater in the heat resistance test, in comparison with the conventional product. Particularly, the laminated glass of the present invention is greater in the excellent weatherability and heat resistance than the conventional product of plasticized polyvinyl butyral, which is owing to the lower hygroscopicity of the resin.

TABLE 1

| Example No. | Base copolymer | | | | Melt index g/10 min | Properties of the interlayer | | | | | | |
|---|---|---|---|---|---|---|---|---|---|---|---|---|
| | Ethylene (% by weight) | Glycidyl meth-acrylate (% by weight) | Vinyl acetate (% by weight) | Methyl acrylate (% by weight) | | Hydration rate of epoxy group (% by mole) | Melt index (g/10 min) | Tensile strength (kg/cm$^2$) | Elongation rate (%) | Tensile impact strength (kg·m/cm$^2$) | Bond strength to glass (kg/15mm) | Refractive* index ($\eta_D^{20}$) |
| Ex. 1 | 72.9 | 19.1 | 8.0 | — | 160 | 39 | <0.001 | 237 | 600 | 870 | 4.5 | 1.499 |
| Ex. 1 | " | " | " | — | " | 56 | <0.001 | 261 | 560 | 1050 | 4.4 | 1.500 |
| Ref. Ex. 1 | " | " | " | — | " | 0 | 160 | 54 | 760 | 260 | 3.1 | 1.497 |
| Ref. Ex. 2 | " | " | " | — | " | 2 | 110 | 84 | 730 | 320 | 3.4 | 1.498 |
| Ref. Ex. 3 | 90.4 | 1.2 | 8.4 | — | 150 | 57 | 90 | 95 | 720 | 410 | 1.7 | — |
| Ex. 2 | 78.3 | 21.7 | — | — | 120 | 52 | <0.001 | 270 | 520 | 1100 | 4.2 | 1.504 |
| Ref. Ex. 4 | " | " | — | — | " | 0 | 120 | 70 | 700 | 360 | 3.1 | 1.501 |
| Ex. 3 | 76.1 | 15.5 | — | 8.4 | 70 | 60 | <0.001 | 281 | 510 | 1150 | 4.1 | — |
| Ref. Ex. 5 | " | " | — | " | " | 0 | 70 | 95 | 680 | 420 | 2.9 | — |
| Ex. 4 | 72.9 | 19.1 | 8.0 | — | 160 | 56 | <0.001 | 247 | 590 | 920 | 4.4 | 1.501 |
| Ex. 5 | " | " | " | — | " | " | " | 249 | 570 | 960 | 4.2 | 1.499 |
| Ref. Ex. 6 | Plasticized polyvinyl butyral | | | | 0.03 | — | 0.03 | 236 | 260 | 840 | 2.5 | 1.483 |

| Example No. | Light transparency (%) | Haze (%) | Properties of laminated glass | | | | | |
|---|---|---|---|---|---|---|---|---|
| | | | Weatherability | | | Impact resistance | Impact resistance | Heat resistance |
| | | | UV irradiation, decreasing rate of permeability (%) | Outdoor exposure | | | | |
| | | | | Decreasing rate of permeability (%) | Change of appearance (color, etc) | | | |
| Ex. 1 | 87.7 | 0.8 | <1.0 | <1.0 | None | Good | Good | Good |
| Ex. 1 | 87.9 | 0.7 | " | " | " | " | " | " |
| Ref. Ex. 1 | 83.5 | 7.5 | " | " | Peeling at circumference | Penetration | Penetration | Foaming from circumference |
| Ref. Ex. 2 | 84.1 | 5.3 | " | " | Peeling at circumference | " | " | Foaming from circumference |
| Ref. Ex. 3 | 83.2 | 7.8 | " | " | Peeling at circumference | " | " | Foaming from circumference |
| Ex. 2 | 86.1 | 3.7 | " | " | None | Good | Good | Good |
| Ref. Ex. 4 | 81.1 | 21.3 | 1.6 | 1.8 | Peeling at circumference | Penetration | Penetration | Foaming from circumference |
| Ex. 3 | 87.3 | 0.8 | <1.0 | <1.0 | None | Good | Good | Good |
| Ref. Ex. 5 | 84.2 | 5.9 | " | " | Peeling at circumference | Penetration | Penetration | Foaming from circumference |
| Ex. 4 | 87.7 | 0.7 | " | " | None | Good | Good | Good |
| Ex. 5 | 87.6 | 0.8 | " | " | " | " | " | " |
| Ref. Ex. 6 | 87.7 | 0.7 | " | " | Peeling at circumference, blushing | Good | Good | Foaming from circumference |

*Refractive index of the glass used: 1.520

What is claimed is:

1. A laminated safety glass comprising at least two glass plates and an interlayer, said interlayer comprising a crosslinked product of a hydration reaction product of an ethylene copolymer comprising (1) 60 to 95% by weight of ethylene, (2) 5 to 40% by weight of glycidyl acrylate or methacrylate, and (3) 0 to 20% by weight of one or more comonomer selected from the group consisting of a vinyl ester having 4 to 10 carbon atoms and an ester of acrylic or methacrylic acid with an alcohol having 1 to 12 carbon atoms wherein said hydration reaction product has a hydration rate of the epoxy group of 5 to 80% per mole and said ethylene copolymer has a melt index of 10 to 500.

2. A laminated safety glass according to claim 1, wherein the hydration rate of epoxy group of the product is in the range of 30 to 70% by mole.

3. A laminated safety glass according to claim 1, wherein the ethylene copolymer is a three-component ethylene copolymer consisting essentially of 70 to 90% by weight of ethylene, 10 to 30% by weight of glycidyl methacrylate, and 3 to 15% by weight of vinyl acetate or methyl acrylate.

* * * * *